United States Patent Office 3,081,200
Patented Mar. 12, 1963

3,081,200
METHOD OF APPLYING AN OXIDE COATING ONTO A NON-POROUS REFRACTORY SUBSTRATE
Edwin H. Tompkins, Chicago, Ill., assignor to Armour Research Foundation of Illinois Institute of Technology, Chicago, Ill., a corporation of Illinois
No Drawing. Filed Apr. 10, 1959, Ser. No. 805,382
3 Claims. (Cl. 117—213)

The present invention relates to a new process for preparing films and coatings containing various selected oxides and compounds of such oxides. More particularly, this invention relates to a spraying process in which the acetylacetonates of such metals are sprayed onto substrates. The coatings resulting from the instant process are suitable as compact and miniaturized electronic components. Compounds of the oxides used have useful magnetic, thermal and electrical properties. For example, said films can be used as bolometers, radiation detectors, computer memories, photoconductive films and many others.

A simplified flow diagram of the process is as follows:

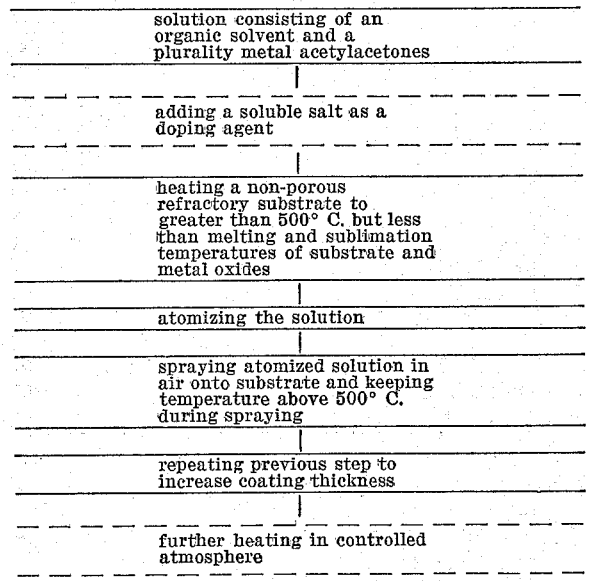

Up to the present time there has been a multitude of means by which various metal oxide films have been deposited, but to my knowledge none of such known processes have utilized acetylacetonates with the benefits resulting therefrom. One example of such prior art is found in U.S. Patent No. 2,763,569, entitled "Spraying Process," wherein, one example therein discloses exposing atomized ammonium zirconyl carbonate in aqueous solution to a surface that is heated to decompose the carbonate and deposit zirconia on the surface.

The present invention utilizes organic solvents, an advantage of which is that complex metal acetylacetonates of almost any metal in the periodic table can be made and that such complexes are quite soluble in organic solvents. Representative elements which form acetylacetonates are vanadium, iron, zinc, zirconium, platinum, thorium, uranium, cerium and other lathanide rare earths. Another advantage of my process is that several metal acetylacetones can be dissolved in the same organic solution, whereas, in aqueous systems interactions between the metal compounds often occur and result in the precipitation of part of the reactants. For example, if ammonium zirconyl carbonate in aqueous solution were mixed with a ferric nitrate solution, hydrated ferric oxide and a basic zirconium salt would precipitate. In the acetylacetonate complexes, on the other hand, the metals lose their normal characteristics because the atoms are shielded by surrounding acetylacetone molecules. Such shielding can best be exemplified by an illustration of a complex, which for zinc acetylacetonate is as follows:

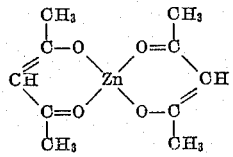

It is accordingly an object of the present invention to provide a process for forming a metal oxide coating on the surface of a heated substrate.

Other and further objects, features and advantages of the instant invention will become apparent to those skilled in the art from the following detailed description of preferred embodiments thereof.

The instant invention consists primarily in a new process for fabrication of miniaturized electronic components, but it should be understood that the following is merely a detailed description of various specific embodiments and the invention is not limited thereto. Said invention resides in the preparation of films and coatings containing oxides of chromium, manganese, iron, cobalt, nickel, copper, zinc and mixtures thereof.

For a better understanding of the present invention together with other and further objects therein, reference is had to the following description, and its scope will be pointed out in the appended claims.

My process makes use of metal acetylacetonates to form an oxide coating having useful magnetic, thermal and electrical properties. In brief, such process consists of spraying various fluids containing selected compounds or gaseous suspensions of such compounds through a spraying apparatus, and directing the resultant spray onto a heated surface to be coated.

Although it is not desired to limit this invention to any particular theory, the general reaction which takes place during the deposition of the oxides may be illustrated by Equation 1 below for ferric acetylacetonate:

(1) $2Fe(CH_3-CO-CH-CO-CH_3)_3 \rightarrow$
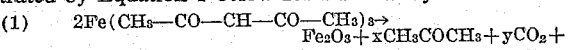
$Fe_2O_3 + xCH_3COCH_3 + yCO_2 +$
other pyrolysis products in smaller quantities wherein $x$ and $y$ vary somewhat with the temperature during the pyrolysis procedure. The quantities $x$ and $y$ are also different for other metal acetylacetonates, but such differences are not important in the application of the reaction as specified here. That is; $x$ and $y$ are equation balancing constants which will vary from a value slightly greater than zero to about one. In a reaction similar to that given in Equation 1 nickel acetylacetonate may give some nickel metal. However, this metal can be oxidized by heating in air, consequently, the best method for preventing the formation of nickel metal consists of spraying in air at low flow rates.

An important point with respect to my invention is the fact that free carbon is not produced in the oxide films. Acetylacetonates when pyrolysed in the absence of air normally yield free carbon and carbides mixed with the metal oxides. The apparatus required herewith is commercially available and consists of the usual non-flammable spraying system and heating means for the plates or objects to be sprayed.

The plates or objects to be coated are heated in a furnace, by induction or by thermal conduction from a hot surface to temperatures in excess of 500° C. While at temperatures above 500° C., the plates or objects are sprayed either with solutions of metal acetylacetones or with dry powdered gas suspensions of the acetylacetones. Inasmuch as there are no fixed upper limits in the heating temperature, it is noted that the temperature must not exceed the melting and sublimation points of the substrates or the metal oxide film. There are many variations on these spray techniques which may be used. Solutions containing up to 3% of one acetylacetonate or up to 3% of each of several acetylacetonates in ethyl acetate and ethanol mixed in the proportion of equal parts by volume have been found to spray satisfactorily onto aluminum oxide plates heated from 500 to 1000° C. Argon gas has been used as the compressed gas, with solutions as well as gaseous suspensions, for spraying in order to reduce flammability but nitrogen, Freon and many other gases could be so used. I have sprayed solutions and powders from medical spray devices, yet almost any non-flammable spray device may be used. Because of the solubility of the acetylacetonates in organic solvents, there is obtained a wide range of compositions of the oxide films. For example, a solution containing up to 30% of one acetylacetonate or up to 30% of several acetylacetonates is feasible in a benzene solvent.

In one particular example of my process I started with 5 grams of zinc acetylacetonate, 0.5 gram of nickel acetylacetonate and 2.7 grams of ferric acetylacetonate and dissolved them in a solvent containing 50% by volume ethanol and 50% by volume ethyl acetate. The total volume of the solution was made up to 100 milliliters. Compacted alumina plates, 1 centimeter by 0.2 centimeters by 10 centimeters, were heated to 950° C. in a furnace and each was removed from the furnace and sprayed in the open air with the solution until the temperature of the plate fell to 600° C. Each plate was then returned to the furnace and reheated to 950° C. before spraying again. This procedure was repeated until each plate had been sprayed twenty times. Thereafter the plate was finally heated for thirty minutes at 950° C. A dark brown adherent coating was obtained on the alumina.

X-ray diffraction analysis showed that spinel structure typical of ferrites was present in the film prepared. This method of analysis does not distinguish the different spinel compounds possible in a film containing oxides of a plurality of metals. That is; the individual spinel compounds are not distinguishable.

For specific applications, the films or coatings are heated in controlled atmospheres after fabrication. The objectives of such treatment is to sinter the oxides and to adjust the degree of oxidation of the metal ions in the oxides.

For ferri-electric films the temperature and oxygen pressure during the final treatment determine the magnetic properties. A film of overall composition $MnFe_2O_4$ when heated in air at 1300 C. and rapidly cooled after heating will form a solid solution of composition

$$MnFe_2O_4 \cdot aMn_3O_4 \cdot 3aFe_2O_3$$

The value of "$a$," which is controlled by time of heating and rate of cooling, determines the magnetic properties of the film. Procedures for heat treating ferrites have been developed extensively and are published in the literature. For example, see, Proceedings of the Institute of Radio Engineers, vol. 43, December 1955, "Some Properties of Ferrites in Connection With Their Chemistry," by E. W. Gorter, pages 1945–1973. The heat treatment also controls the electrical conductivity characteristics of the films. In the $MnFe_2O_4$ compound relatively high electrical conductivities will be obtained when the concentrations of the $Fe^{++}$ and $Fe^{+++}$ are both high. The essential condition is that two valence states of one or more elements exists in the solid. These and other principles can be applied to the preparation of films of specific properties.

A number of salts, such as lithium acetate, lithium chloride or sodium propionate, are soluble in ethanol and a number of other organic solvents. Therefore, these salts can be incorporated in the films as sintering or doping agents. Lithium doped nickel oxide, for example, could be made by spraying an ethynol-ethylacetate solution of lithium acetate and nickel acetylacetonate.

I have made nickel oxide films which showed a decrease of resistance through a factor of 450 on heating from 50° C. to 500° C. It is noted that oxides and compounds of oxides are well known for their high temperature coefficients of resistivity. However, films made from acetylacetonates could be deposited on thin alumina substrates (available commercially) and made into sensitive bolometer devices.

In conclusion, the preparation of films of ferrites, ferrielectrics and other oxide compositions is difficult because of the unreactive nature of most oxides. However, by my process the oxides produced by the pyrolysis are thoroughly mixed and therefore, reactive. The future of miniaturization of electronic and computer components largely hinges on the development of new film making processes, such as mine. Also, an outstanding advantage of my process is the extreme versatility afforded thereby. Almost all elements can now be obtained as organic compounds which will dissolve in some practical solvent. My process is also advantageous in that materials can be sprayed with the same equipment.

The foregoing detailed description has been given for clearness of understanding only, and no unnecessary limitations should be understood therefrom, for modifications will be obvious to those skilled in the art.

I claim as my invention:

1. The method of forming adherent metal oxide films on non-porous refractory substrates which comprises the steps of: preparing a solution consisting of an organic solvent and at least a plurality of different metal acetylacetones wherein the metals are selected from the group consisting of chromium, manganese, iron, cobalt, nickel, copper and zinc; heating the substrate to a temperature greater than about 500° C. but less than the melting and sublimation temperatures of the substrate and oxides of the metals, whichever occurs first; atomizing the solution; and directing the atomized solution against the heated substrate in air so long as the substrate surface remains hotter than a temperature greater than about 500° C. to yield a spinel structure on the substrate surface which contains only oxides of the metal acetylacetones, and repeating the last mentioned step as many times as necessary to attain a film corresponding to a predetermnied thickness.

2. The method of claim 1 wherein a salt is added to the solution which salt is selected from the group consisting of lithium acetate, lithium chloride and sodium propionate.

3. The method of applying an oxide coating onto a non-porous refractory substrate comprising the steps of preparing a mixture of powders of at least a plurality of acetylacetones selected from the group consisting of chromium, manganese, iron, cobalt, nickel, copper and zinc that are thermally decomposable to yield directly metal oxides; and spraying such mixture in gaseous suspension, in the presence of oxygen, onto a substrate heated to above about 500° C. but less than the melting and sublimation temperatures of the substrate and metal oxides, whichever occurs first, to yield a spinel structure on the substrate which contains only oxides of the metal acetylacetones; and repeating the last mentioned step as many times as necessary to attain a coating of pre-determined thickness.

References Cited in the file of this patent
UNITED STATES PATENTS

| 2,430,520 | Marboe | Nov. 11, 1947 |
| 2,694,651 | Pawlyk | Nov. 16, 1954 |
| 2,704,728 | Pawlyk | Mar. 22, 1955 |
| 2,734,874 | Drake et al. | Feb. 14, 1956 |
| 2,784,115 | Brinsmaid et al. | Mar. 5, 1957 |
| 2,919,207 | Scholzel | Dec. 29, 1959 |
| 2,930,106 | Wrotnowski | Mar. 29, 1960 |
| 2,941,903 | Winston | June 21, 1960 |